United States Patent
Kasai et al.

(12) 
(10) Patent No.: US 6,459,864 B2
(45) Date of Patent: Oct. 1, 2002

(54) IMAGE FORMING SYSTEM, METHOD OF CONTROLLING IMAGE FORMING SYSTEM, AND STORAGE MEDIUM

(75) Inventors: Kazuhiro Kasai; Hidehiko Asai; Yasushi Shimizu, all of Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/852,628

(22) Filed: May 11, 2001

(30) Foreign Application Priority Data

May 16, 2000 (JP) ........................................ 2000-143594

(51) Int. Cl.$^7$ .............................. G03G 15/00; H06F 3/12
(52) U.S. Cl. .......................... 399/82; 399/194; 399/363; 399/407
(58) Field of Search .............................. 399/82, 16, 45, 399/194, 363, 85, 407

(56) References Cited

U.S. PATENT DOCUMENTS 4,707,126 A * 11/1987 Ohshima et al. ........ 399/194 X
4,825,250 A * 4/1989 Miyata et al. ................. 399/82
4,855,794 A * 8/1989 Suzuki ...................... 399/82 X
5,999,767 A * 12/1999 Ando ........................... 399/85

* cited by examiner

Primary Examiner—Sophia S. Chen
(74) Attorney, Agent, or Firm—Fitzpatrick, Cella, Harper & Scinto

(57) ABSTRACT

An image forming system selects any one of plural image forming modes including a first mode, wherein an image forming process is performed such that plural images are arranged on an identical face of a sheet. The system performs the image forming process based on the selected image forming mode and inhibits a working process for the sheets on which the images have been formed When printing is performed for a postcard or the like, the system shortens a printing time necessary to print an output result desired by a user, obviates a user's erroneous operation, and prevents creating an unpurposed output matter.

40 Claims, 14 Drawing Sheets

ORDINARY POSTAL CARD

FOUR-CONNECTIVE POSTCARD

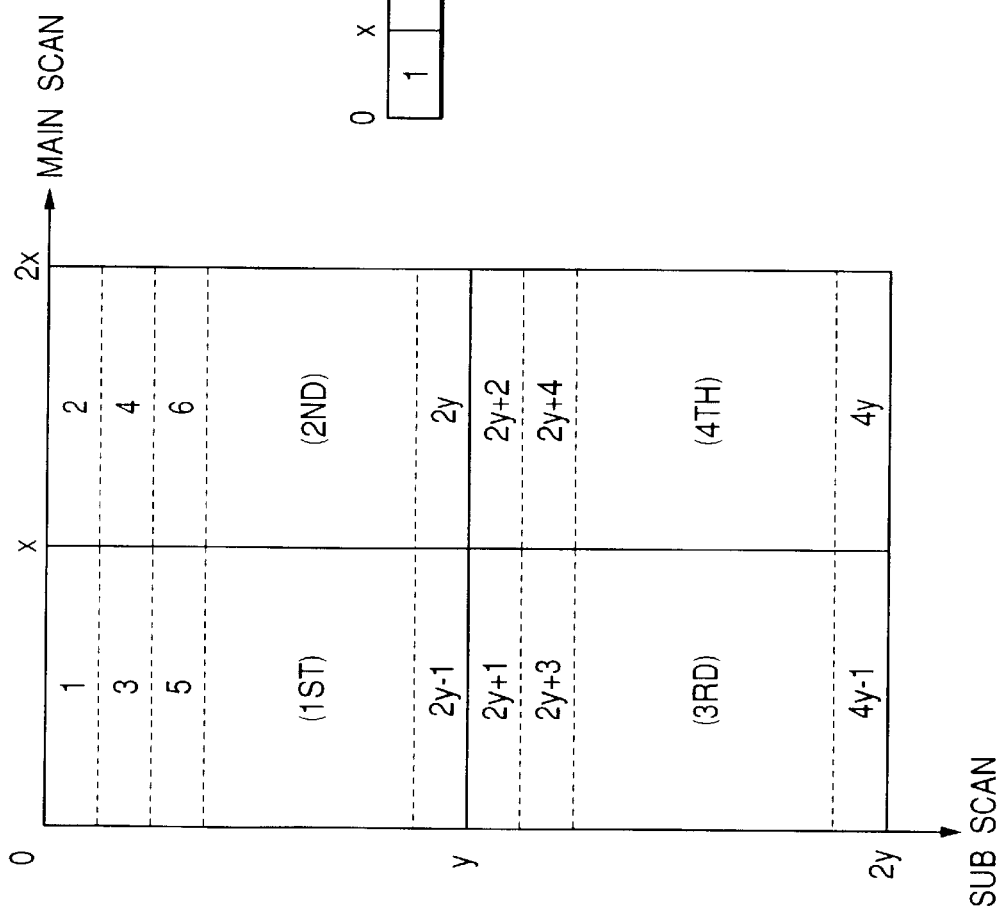

INPUT IMAGE MEMORY

OUTPUT IMAGE MEMORY (COPY CONTENTS)

IMAGE FORMING SYSTEM, METHOD OF CONTROLLING IMAGE FORMING SYSTEM, AND STORAGE MEDIUM

BACKGROUND OF THE INVENTION

1. Field of the Invention

The present invention relates to an image forming system which forms an image on a sheet, a method of controlling the image forming system, and a storage medium.

2. Related Background Art

In recent years, as an image forming system is digitalized, image output by various methods has become possible. For example, in addition to a function such as a trimming function to read only a desired part of an original and a function such as a masking function to not read only a desired part of an original, there is a function such as an image repeat function to be able to output, by reading an original image only once, the read image at several places on an output sheet. Further, when a lot of copies are output from one original, reading of the original ends only by one time. Further, an image forming system which has a punching function to punch a recording sheet and a stapling function to staple recording sheets is being proposed.

However, in a case of printing a large number of postcards, it takes a long time because the printing is performed one postcard at a time.

Further, in a case where the punching function and the stapling function are automatically set, there is a problem that, even if punching and stapling are not desired for a recording sheet, the punching and stapling are automatically performed when the size of the recording sheet exceeds a provided size. Thus, if a user does not wish to use the punching function and the stapling function, it is necessary for the user to manually not select these functions.

SUMMARY OF THE INVENTION

An object of the present invention is to provide an image processing apparatus which solves the above problems.

Another object of the present invention is to provide an image forming system which can shorten a printing time necessary to print a postcard and the like to obtain a user's desired output result, obviate an erroneous operation by a user, prevent the user from creating an unpurposed and unintended output matter, and create the user's desired output result, a method of controlling the image forming system, and a storage medium.

Other objects and features of the present invention will be clarified through the following description in the specification and the attached drawings.

BRIEF DESCRIPTION OF THE DRAWINGS

FIGS. 14A and 14B are diagrams for explaining an output image memory area and an output image memory, respectively;

DESCRIPTION OF THE PREFERRED EMBODIMENTS

An entire structure of an image forming system according to the embodiment of the present invention will be explained with reference to the attached drawings.

Figure 1:
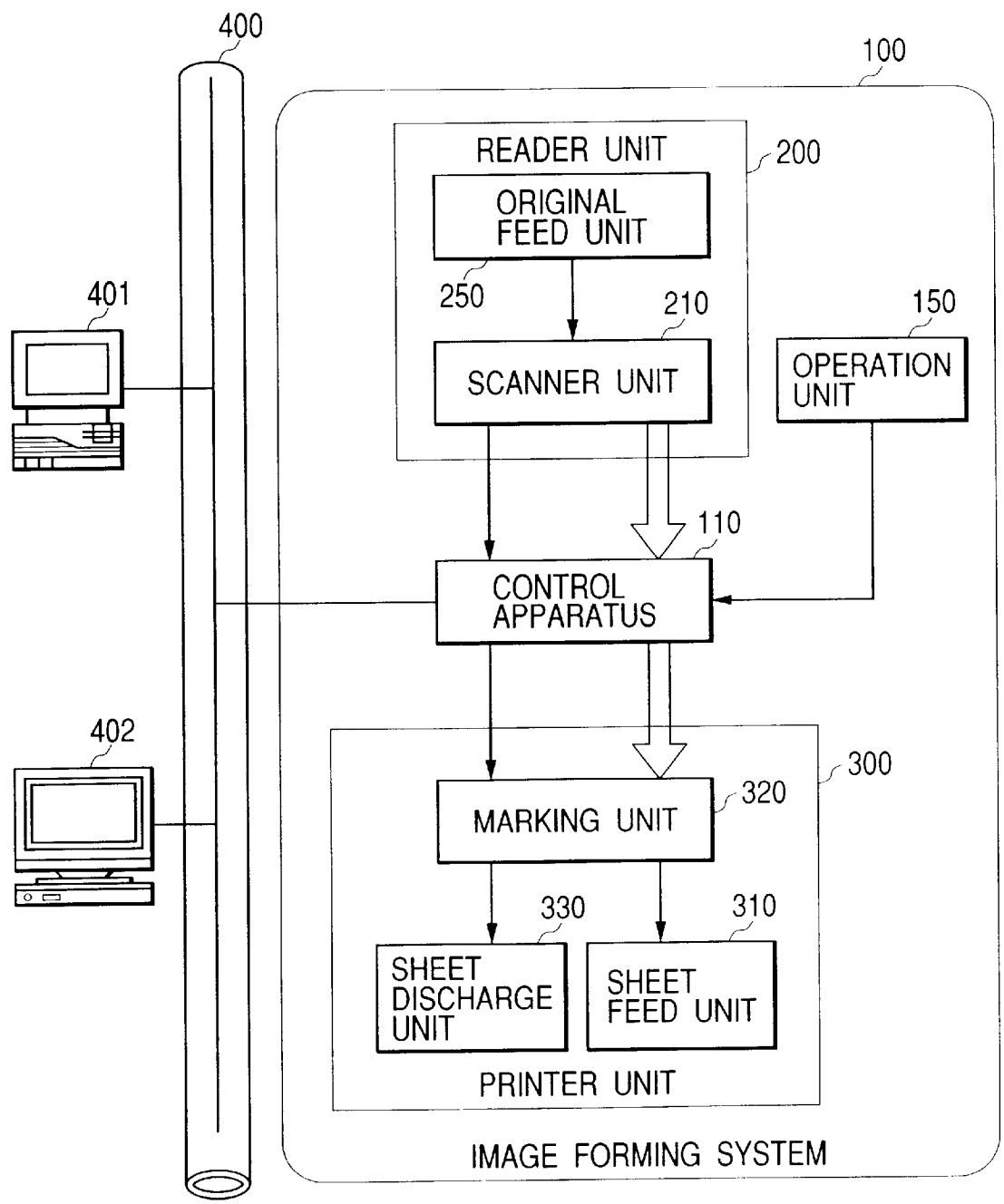
FIG. 1 is a block diagram showing an entire structure of an image forming system according to the embodiment of the present invention.

FIG. 1 is a block diagram showing the entire structure of the image forming system according to the embodiment of the present invention.

In FIG. 1, an image forming system 100 includes a reader unit 200 acting as an image input apparatus, a printer 300 unit 300 acting as an image output apparatus, and a control apparatus 110.

The reader unit 200 optically reads an original image and then converts it into image data. The reader unit 200 is composed of a scanner unit 210 having a function to read the original image, and an original feed unit 250 having a function to transport an original sheet.

The printer unit 300 transports a recording sheet, prints the image data thereon as a visible image, and then discharges the recording sheet outside. In the printer unit 300, a not-shown sensor is disposed on a transportation path such that this sensor can detect the size of the recording sheet. The printer unit 300 is composed of a sheet feed unit (i.e., a sheet feed means) 310 having plural kinds of recording sheet cassettes, the above recording sheet size sensor, a marking unit 320 having a function to transfer and fix the image data to the recording sheet, a sheet discharge unit 330 having a function to perform sorting, stapling and punching for the image-formed recording sheets and then discharge the processed sheets outside, and the like.

The control apparatus 110 is electrically connected to the reader unit 200 and the printer unit 300, and is further connected to host computers 401 and 402 through a LAN (local area network) 400.

The control apparatus 110 controls the reader unit 200 to read the image data on the original, and controls the printer unit 300 to output the image data to the recording sheet, whereby a copying function is provided. Further, a scanner function to convert the image data read by the reader unit 200 is converted into code data and transmit this code data to the host computer through the LAN 400 is provided, and also a printer function to convert code data received from the host computer through the LAN 400 into image data and output this image data to the printer unit 300 is provided.

An operation unit 150 which is made by a liquid crystal touchscreen is connected to the control apparatus 110. The operation unit 150 provides a user I/F (interface) which is used to operate the image forming system 100.

Figure 2:
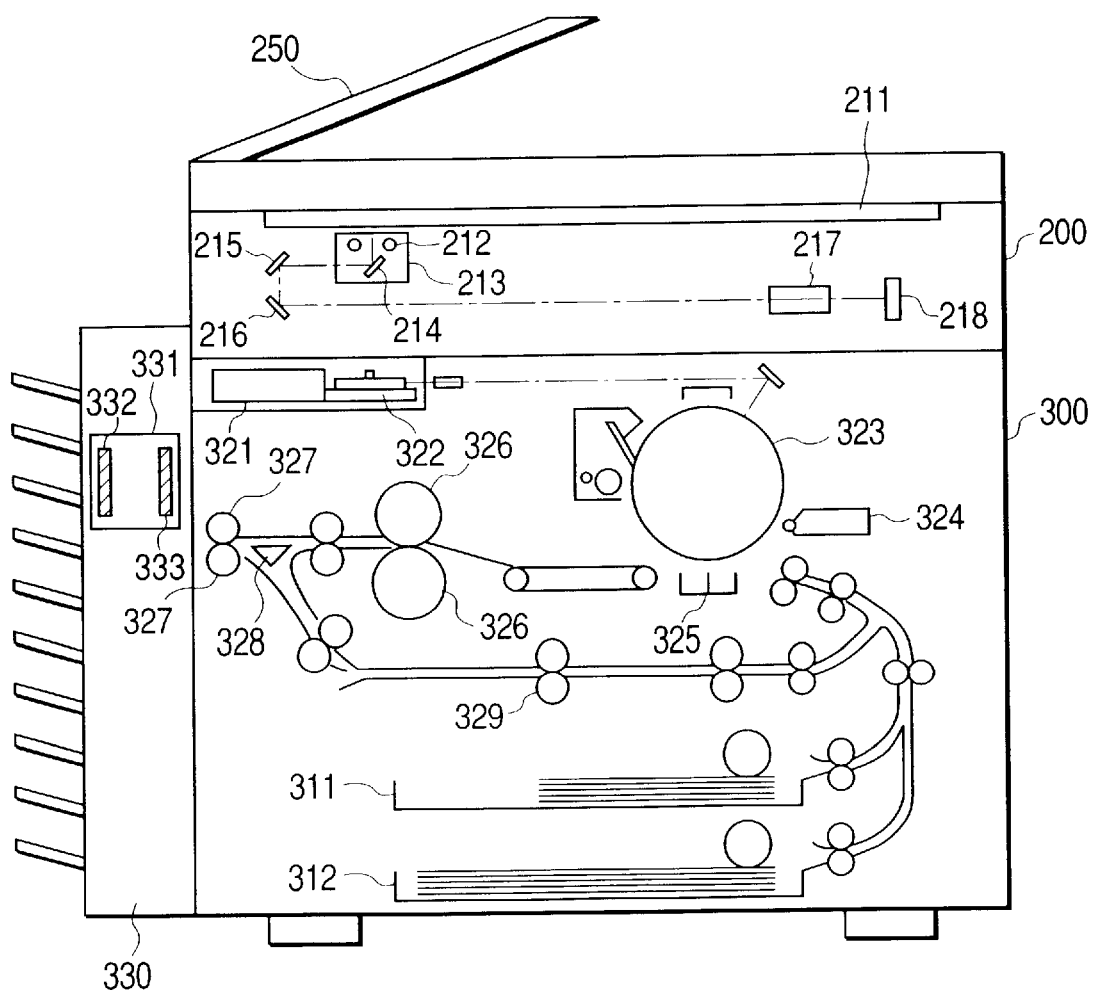
FIG. 2 is a sectional diagram showing a reader unit 200 and a printer unit 300 in FIG. 1.

FIG. 2 is a sectional diagram showing the reader unit 200 and the printer unit 300. The original feed unit 250 of the reader unit 200 feeds the original one by one in due order from its first page to a platen glass 211, and discharges the original on the platen glass 211 after original reading ends. When the original is put on the platen glass 211 or fed from the original feed unit 250, a lamp 212 is lit, and a shift of an optical unit 213 is started, whereby the original is exposed and scanned. At this time, reflection light from the original is guided to a CCD (charge-coupled device) image sensor (simply called a CCD hereinafter) 218 through mirrors 214, 215 and 216 and a lens 217. Thus, an image of the scanned original is read by the CCD 218, and image data output from the CCD 218 is subjected to a predetermined process and then transferred to the control apparatus 110. A not-shown original size sensor is disposed on an original transportation path of the reader unit 200, and information representing the detected original size is also transferred to the control apparatus 110.

A laser driver 321 of the printer unit 300 drives a laser beam generation unit 322 to generate a laser beam on the basis of the image data output from the control apparatus 110. The generated laser beam is irradiated on a photosensitive drum 323, and thus a latent image according to this laser beam is formed on the photosensitive drum 323. A development agent is adhered to the parts corresponding to the formed latent image by a development unit 324. On the other hand, at a timing synchronous with the start of the laser beam irradiation, a recording sheet is fed and transported from any one of cassettes 311 and 312 to a transfer unit 325, and then the development agent on the photosensitive drum 323 is transferred to the transported recording sheet. The recording sheet to which the development agent has been transferred is transported to a fixing unit 326, and the development agent is fixed to this sheet by heat and pressure of the fixing unit 326 is discharged to the sheet discharge unit 330 by sheet discharge rollers 327. In the sheet discharge unit 330, the discharged recording sheets are sheaved and sorted by a sorting unit 331, and the sorted recording sheets are stapled by a stapling unit 332 and/or punched by a punching unit 333. In a case where a two-faced recording mode is set, after the recording sheet is transported to the sheet discharge rollers 327, the rotation direction of each roller 327 is reversed, and thus the recording sheet is guided to a sheet refeed transportation path 329 by a flapper 328. The recording sheet guided and set on the sheet refeed transportation path 329 is fed to the transfer unit 325 at the above-mentioned timing.

Although it is not shown in the drawings, a sensor for detecting presence/absence of the sheet, a control board for regulating the sheets, and the like are disposed in each of plural sheet feed units including the cassettes 311 and 312, whereby the information such as the presence/absence of the sheet, the size of the sheet, and the like can be detected for each sheet feed unit, and the obtained information can be transferred to the control apparatus 110 through signal lines. Further, the sheet feed cassette can be set on the operation unit 150. Namely, it is possible to set for each cassette a kind of sheet should be stored, a size of the sheet (e.g., a sheet dedicated for a four-connective postcard) that should be stored, and the like. The control apparatus 110 performs various processes shown in later-described flowcharts, on the basis of the information set by the user. It should be noted that several methods can be applied as the method of detecting the recording sheet size. For example, in one method, to detect the recording sheet size, only the length along the width direction of the recording sheet is detected by the control board disposed in the cassette, and only the length along the transportation direction of this recording sheet is detected by the not-shown sensor disposed on the sheet transportation path. In another method, to detect the recording sheet size, the size information included in the setting information to be set on the operation unit for each sheet feed unit is read from a memory.

Figure 3:
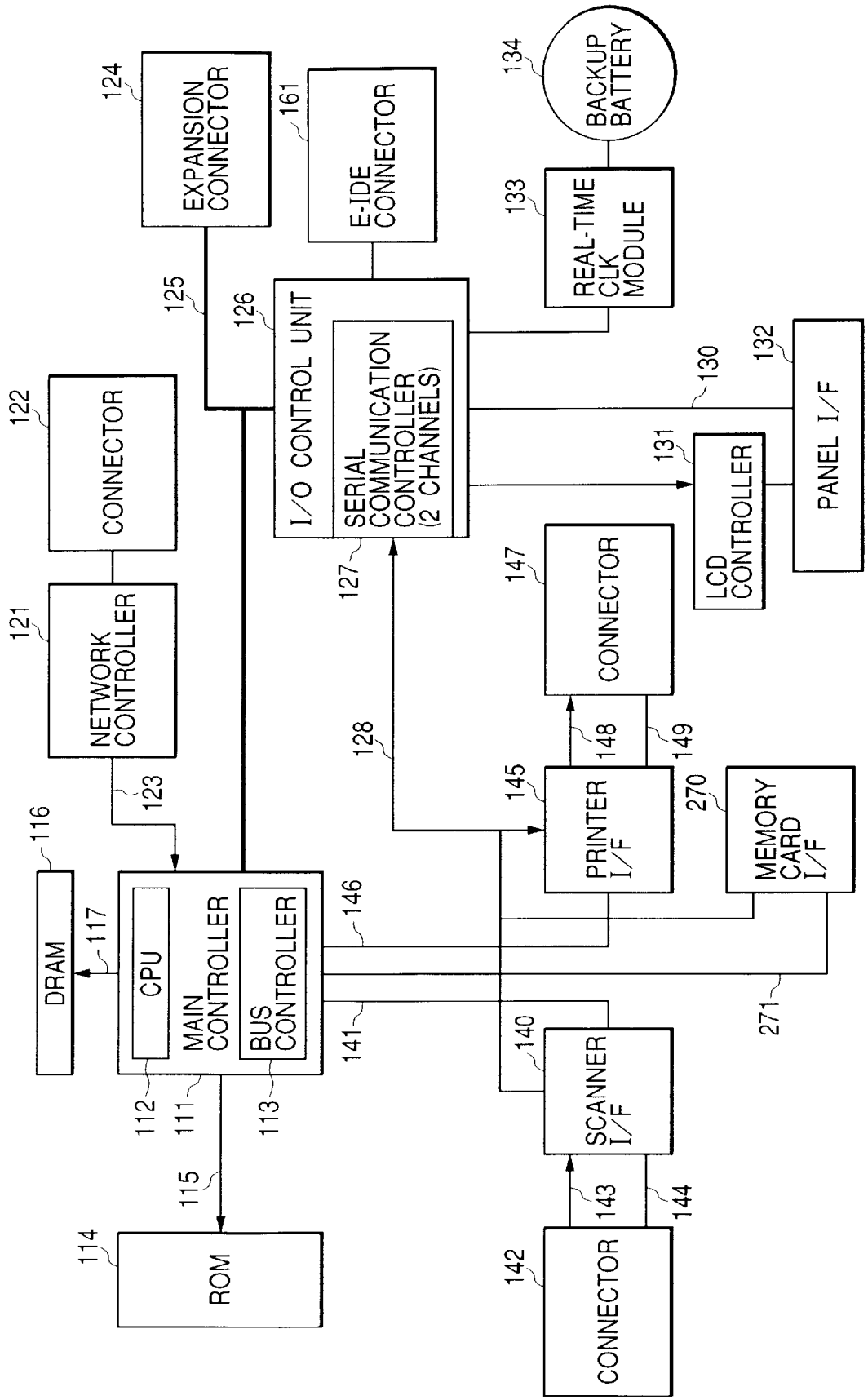
FIG. 3 is a block diagram showing a structure of a control apparatus 110 in FIG. 1.

FIG. 3 is a block diagram showing a structure of the control apparatus 110.

A main controller 111 is mainly composed of a CPU 112, a bus controller 113 and various I/F controller circuits.

The CPU 112 and the bus controller 113 control the entire operation of the control apparatus 110, and the CPU 112 operates based on a program read from a ROM 114 through a ROM I/F 115. Further, an operation by which PDL (page description language) code data received from the host computer 401 is interpreted and expanded into raster image data has been also described in this program and is performed according to software. The bus controller 113 controls data transfer among plural interfaces, and also controls bus contention adjustment and DMA (direct memory access) data transfer.

A DRAM (dynamic random-access memory) 116 which is connected to the main controller 111 through a DRAM I/F 117 is used as a working area for the operation of the CPU 112 and an area for storing image data.

A network controller 121 is connected to the main controller 111 through an I/F 123 and also connected to an external network such as an Ethernet or the like through a connector 122.

A general-purpose high speed bus 125 such as a PCI (peripheral component interconnect) bus is connected to an expansion connector 124 for connecting an expansion board and also connected to an I/O (input/output) control unit 126.

The I/O control unit 126 includes a two-channel start/stop system serial communication controller 127 for transmitting/receiving control commands to/from the CPU's of the reader unit 200 and the printer unit 300. The serial communication controller 127 is connected to a scanner I/F 140 and a printer I/F 145 being external I/F circuits, through an I/O bus 128.

A panel I/F 132 which is connected to an LCD (liquid crystal display) controller 131 is composed of an interface for performing display on the liquid crystal screen on the operation unit 150 and a key input I/F bus 130 for performing hard-key input and touchscreen-key input.

The operation unit 150 includes an LCD unit, and a touchscreen input device and plural hard keys provided on the LCD unit. The signal input by the touchscreen input device or the hard key is transferred to the CPU 112 through the panel I/F 132, while the image data transferred from the panel I/F 132 is displayed on the LCD unit. Namely, functions and image data which are used and managed in the operation of the image forming system are displayed on the LCD unit.

A real-time clock module 133 which updates and stores date and time managed in the apparatus is backed up by a backup battery 134.

An E-IDE (Enhanced Integrated Drive Electronics) connector 161 acting as an E-IDE interface is used to connect external storage devices. Namely, a hard disk drive and a CD-ROM drive are connected through this E-IDE interface to be able to read and write various programs and image data.

A connector 142 which is connected to the reader unit 200 is composed of a start/stop system serial I/F 143 and a video I/F 144, and a connector 147 which is connected to the printer unit 300 is composed of a start/stop system serial I/F 148 and a video I/F 149.

The scanner I/F 140 is connected to the reader unit 200 through the connector 142 and also connected to the main controller 112 through a scanner bus 141. The scanner I/F 140 has a function to perform an optimum binarizing process for the image from the reader unit 200 and a magnification change process in main and subscan directions of this image, according to contents of later processes. Further, the scanner I/F 140 has a function to output a control signal generated based on a video control signal from the reader unit 200, to the scanner bus 141.

The data transfer from the scanner bus 141 to the DRAM 116 is controlled by the bus controller 113.

The printer I/F 145 is connected to the printer unit 300 through the connector 147 and also connected to the main controller 111 through a printer bus 146. The printer I/F 145 has a function to perform a smoothing process for the image data output from the main controller 111 and then output the processed image data to the printer unit 300. Further, the printer I/F 145 has a function to output a control signal generated based on a video control signal from the printer unit 300, to the printer bus 146.

The transfer of the raster image data expanded on the DRAM 116 to the printer unit 300 is controlled by the bus controller 113. Namely, the raster image data is DMA-transferred to the printer unit 300 through the printer bus 146 and the video I/F 149. Incidentally, a memory card I/F 270 which is connected to the main controller 111 through a bus 271 has a function to exchange data to an external memory card.

Hereinafter, the operation of the image forming system according to the embodiment of the present invention will be explained with reference to FIGS. 4 and 5.

Figure 4:
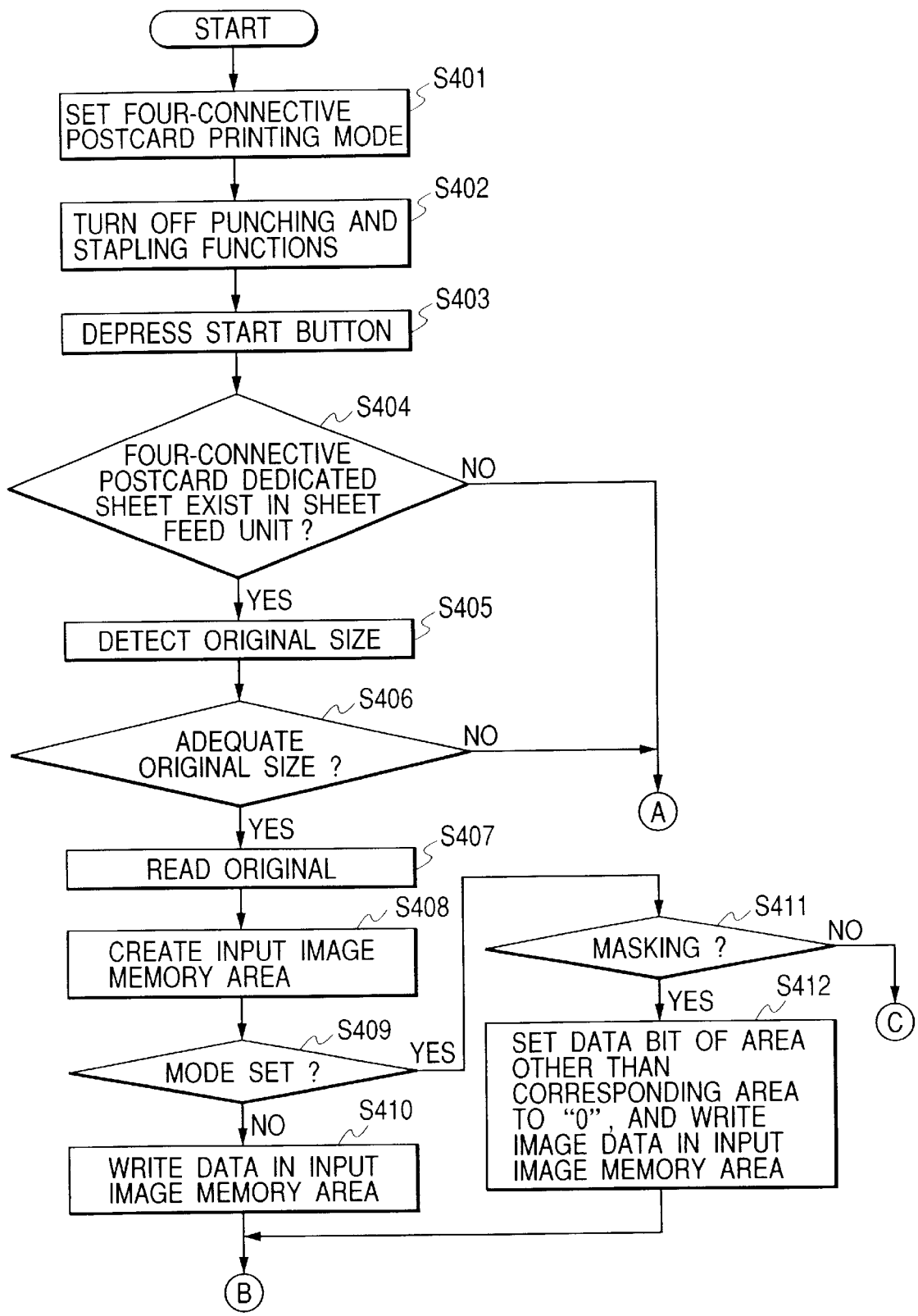
FIG. 4 is a flowchart showing an operation of the image forming system according to the embodiment of the present invention.
Figure 5:
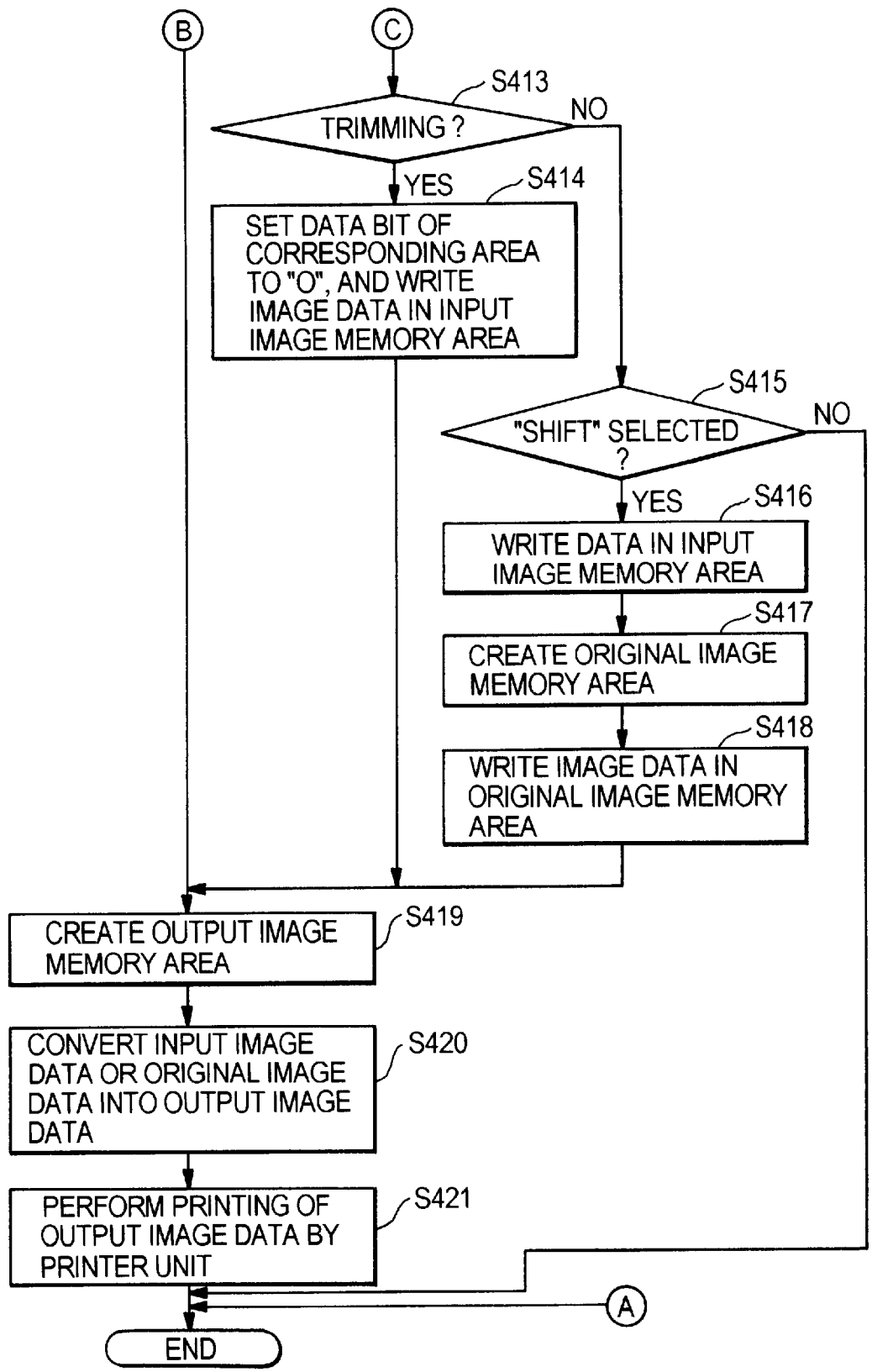
FIG. 5 is a flowchart showing the operation of the image forming system according to the embodiment of the present invention.

FIGS. 4 and 5 are flowcharts showing the operation of the image forming system according to the embodiment of the present invention.

The image forming system includes, as executable operation modes, various image forming modes such as an ordinary copying mode, a two-faced printing mode, an N-in-1 mode (a reduction layout mode to arrange and form image data of mutually different plural pages on one recording sheet), a 1-to-N mode (an enlargement layout mode to divide image data of one page into plural image data and form these data respectively on different recording sheets), and the like. Besides, the image forming system includes plural specific image forming modes such as a four-connective postcard printing mode and the like. Thus, on the operation unit 150 or the like, the user can select the desired mode from among these modes. Hereinafter, a case where the four-connective postcard printing mode is executed will be explained.

Figure 6A:
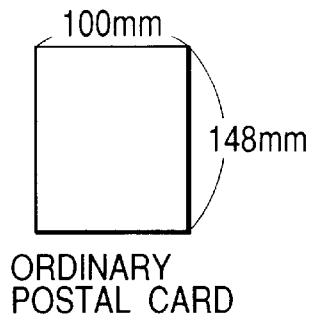
FIGS. 6A and 6B are diagrams for explaining an ordinary postcard and a four-connective postcard, respectively.
Figure 6B:
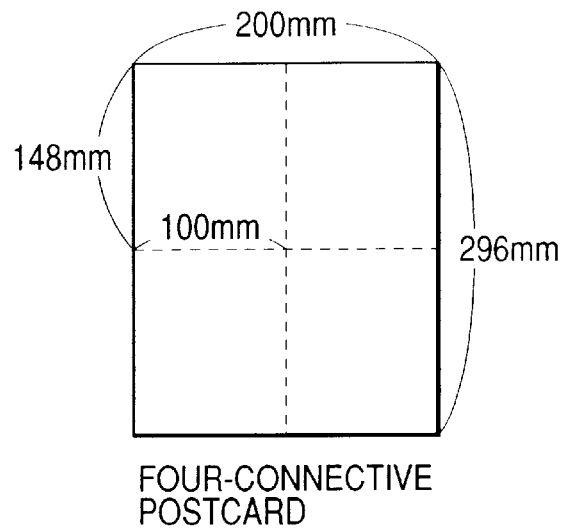

First, the user puts a sheet of which the size corresponds to that of a postcard being an original on the platen glass 211, and sets a four-connective postcard dedicated sheet to the cassette 311. As shown in FIGS. 6A and 6B, the four-connective postcard dedicated sheet (FIG. 6B) is the sheet of which the size corresponds to the total size of four ordinary (commercially available) postal cards (FIG. 6A). Namely, the four-connective postcard dedicated sheet has the size corresponding to the two ordinary postcards in the longitudinal direction and also has the size corresponding to the two ordinary postcards in the lateral direction. If it is assumed that the length of one postal card is about 100 mm in the lateral direction and about 148 mm in the longitudinal direction (FIG. 6A), the size of the four-connective postcard dedicated sheet is about 200 mm in the lateral direction and about 296 mm in the longitudinal direction (FIG. 6B). Further, it is assumed that the thickness of the four-connective postcard dedicated sheet is the same as that of the postcard card, i.e., the thickness of this sheet is somewhat thicker than the thickness of an ordinary copy sheet. Then, for example, an identical image is formed on each of such four-divided areas. Incidentally, on the four-connective postcard dedicated sheet shown in FIG. 6B, broken lines have been previously added as an indication, which is used when a user or a machine cuts this sheet into four pieces after an image forming job has ended. Besides, in a case where such the four-connective postcard dedicated sheet as above-discussed is not used and instead an ordinary sheet (e.g., not a thick sheet, a sheet on which any broken line is not added, or the like) is used, if the sheet to be used has the size corresponding to that of the four-connective postcard dedicated sheet (296 mm×200 mm), it is permitted to set the four-connective postcard printing mode.

Figure 7A:
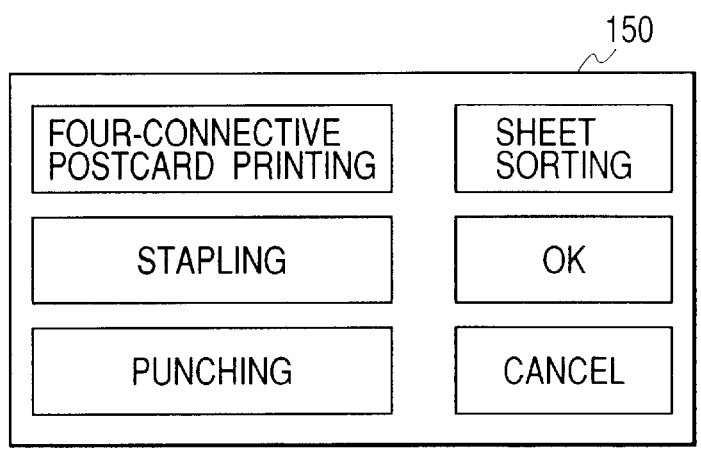
FIGS. 7A and 7B are diagrams showing an example of a display on an operation unit 150 in FIG. 1.
Figure 7B:
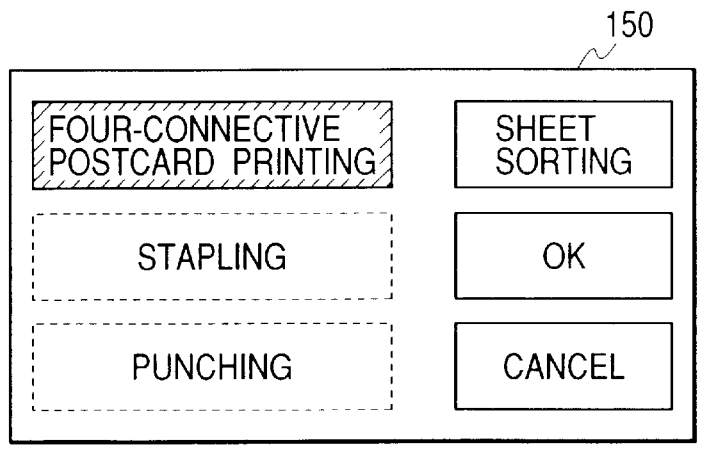

FIGS. 7A and 7B are diagrams showing an example of a screen displayed on a display panel of the operation unit 150. It should be noted that this screen is displayed when an application mode key on a not-shown copying screen is depressed.

On the screen of FIG. 7A, the user can set various setting for a four-connective postcard printing mode, a stapling mode, a punching mode, a sheet sorting mode and the like. When a "STAPLING" button is depressed and an "OK" button is then depressed by the user, the stapling unit 332 is controlled to perform the stapling process to the sheets on which the images were formed. When a "PUNCHING" button is depressed and the "OK" button is then depressed by the user, the punching unit 333 is controlled to perform the punching process to the sheets on which the images were formed.

In the embodiment, when a "FOUR-CONNECTIVE POSTCARD PRINTING" button is depressed by the user on the screen of FIG. 7A, it is controlled to change the displaying state of this screen to the displaying state shown in FIG. 7B. On the screen of FIG. 7B, since the "FOUR-CONNECTIVE POSTCARD PRINTING" button was depressed by the user, the "STAPLING" button and the "PUNCHING" button are set to be unavailable. Thus, in the four-connective postcard printing mode, the activation of the stapling unit 332 and the punching unit 333 is controlled to inhibit the stapling process and the punching process (later described in detail).

In the case where the image forming mode (e.g., the ordinary copying mode, the two-faced printing mode, the N-in-1 mode, the 1-to-N mode or the like) other than the four-connective postcard printing mode, the activation of the stapling unit 332 and the punching unit 333 is controlled to permit the stapling process and the punching process.

Figure 8:
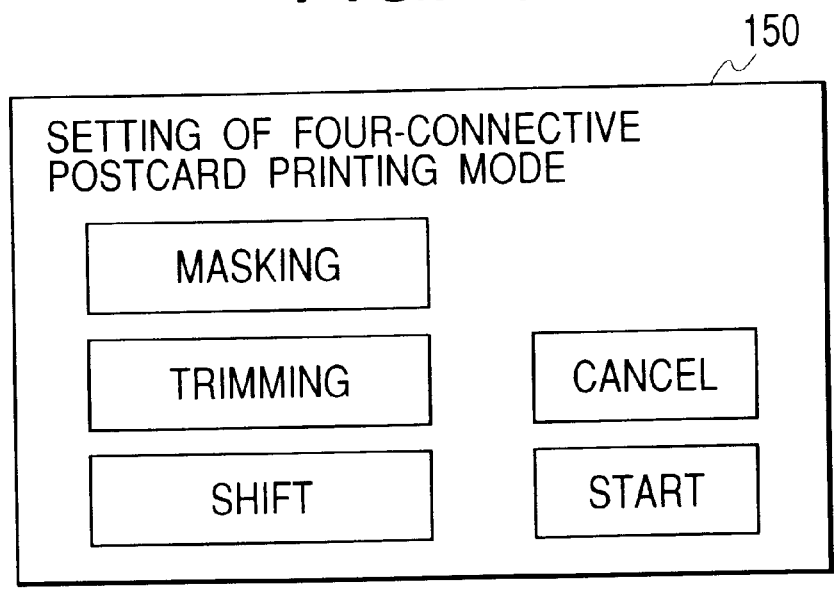
FIG. 8 is a diagram showing an example of a display on the operation unit 150 in FIG. 1.

In the flowchart of FIG. 4, on the screen of FIG. 7A displayed on the panel of the operation unit 150, according as the "FOUR-CONNECTIVE POSTCARD PRINTING" button is selected (at this time, the displaying state is changed to the state shown in FIG. 7B) and the "OK" button is then selected, the four-connective postcard printing mode is set (step S401). Thus, it is controlled to change the screen on the operation unit 150 to the screen shown in FIG. 8. It should be noted that the screens shown in FIGS. 7A, 7B and 8 are directed to one example of the change of the displayed contents, but the displayed contents are not limited to them.

In FIGS. 7A and 7B, when the "FOUR-CONNECTIVE POSTCARD PRINTING" button is selected, stapling and punching functions are set to be unavailable (OFF) such that these functions are erroneously used by the user (step S402). In this case, a sheet sorting function is not set to be unavailable but is maintained to be available (FIG. 7B). On the screen of FIG. 7B, the set items corresponding to the stapling and punching functions are set to be not selectable. For example, the "STAPLING" and "PUNCHING" buttons respectively corresponding to the stapling and punching functions are displayed in dots, gray, shading or the like, such that these buttons do not respond even if depression is performed by the user (i.e., a selection inhibition state). On the other hand, the "SHEET SORTING" button is still displayed in solid line and thus available (i.e., a selectable state).

In the embodiment, the reason such a control as abovementioned should be performed will be explained hereinafter. As shown in FIGS. 6A and 6B and the above-given disclosure, the four-connective postcard dedicate sheet (including the other sheet having the size corresponding to that of the four-connective postcard dedicated sheet) in the embodiment is the sheet of which type (e.g., the size, the thickness and the like) is different from that of the ordinary recording sheet. The control is difficult when the stapling process or the punching process is performed for the sheets of such a different type, and there is a possibility that such the processes can cause breakdown of the units for these processes. Foremost, the above four-connective postcard dedicated sheet is the sheet which aims, after the images are formed thereon, to be manually or mechanically cut and divided into four pieces and to be used as postcards such as a New Years's card or the like. Thus, if the sheet working process such as the stapling process or the punching process is performed for the sheets having the above-noted aim, the sheets become no use as a whole, thereby waste of resources. In consideration of such a reason, the above-noted control is performed. Thus, it is possible to obviate the user's erroneous operation that, e.g., the user erroneously depresses the button to perform the sheet working process such as the stapling process, the punching process or the like. Further, it is possible to prevent the disadvantage that, even though any function button is not depressed, the sheet working process such as the stapling process, the punching process or the like is automatically performed.

As described above, in the present invention, even if the sheet (e.g., an ordinary sheet, a plain sheet or the like) of the type (material type) other than the four-connective postcard dedicated sheet having the thickness corresponding to that of the postal card is used, when this sheet has the size (material size) suitable for the four-connective postcard printing mode, it is controlled to permit execution of this four-connective postcard printing mode.

Therefore, for example, in the case where the four-connective postcard printing mode is selected, even if the recording sheet to which the image should be formed is the recording sheet (e.g., a recording sheet such as an ordinary sheet of type and size capable of being processed by the stapling unit or the punching unit) other than the four-connective postcard dedicated sheet, it is controlled as shown in FIG. 7B to inhibit the sheet working processes such as the stapling process, the punching process and the like in the state that the four-connective postcard printing mode is being selected.

In other words, irrespective of the judgement as to what type (media type) of sheet the image should be formed on, the judgement as to whether the above sheet working process should be performed is performed and determined on the basis of the judgement as to whether the four-connective postcard printing mode is selected by the user and the judgement as to whether the size (media size) of the sheet on which the image should be formed is adequate or appropriate.

Thus, in the case there is no four-connective postcard dedicated sheet, it is possible to flexibly cope with such a situation by using a substitute sheet, whereby the output becomes possible on various types of sheets. Further, it is possible to prevent the disadvantage that, even though the four-connective postcard printing mode is being selected, the stapling process, the punching process or the like is permitted because the type of sheet on which the image is formed is, e.g., the ordinary sheet, whereby it is possible to create a user's desired output result without creating an unpurposed and unintended output result.

Next, when a "START" button on the screen shown in FIG. 8 is depressed (step S403), a series of original image reading (described later) is started (steps S404 to S408).

In the step S404, it is judged whether the four-connective postcard dedicated sheet is present in the sheet feed unit. Concretely, in the setting of the sheet feed cassette, it is judged whether a sheet is present in the sheet feed unit which has been set to hold and store the four-connective postcard dedicated sheet. If judged that no sheet is present in this sheet feed unit, the flow ends, while if judged that the sheet is present in this sheet feed unit, the size of the recording sheet present in this sheet feed unit being the target unit is dedicated (step S405). Then, it is judged whether the detected size is adequate or appropriate (i.e., the size corresponding to the size of the four-connective postcard dedicated sheet) (step S406). If it is judged in the step S406 that the detected size is not adequate, the flow ends, while if it is judged that the detected is adequate, the image of the original is read (step S407). For example, when the original such as a postcard is read, the control apparatus 110 creates an input image memory area for the read image and stores the read image data therein (step S408).

Figure 13A:
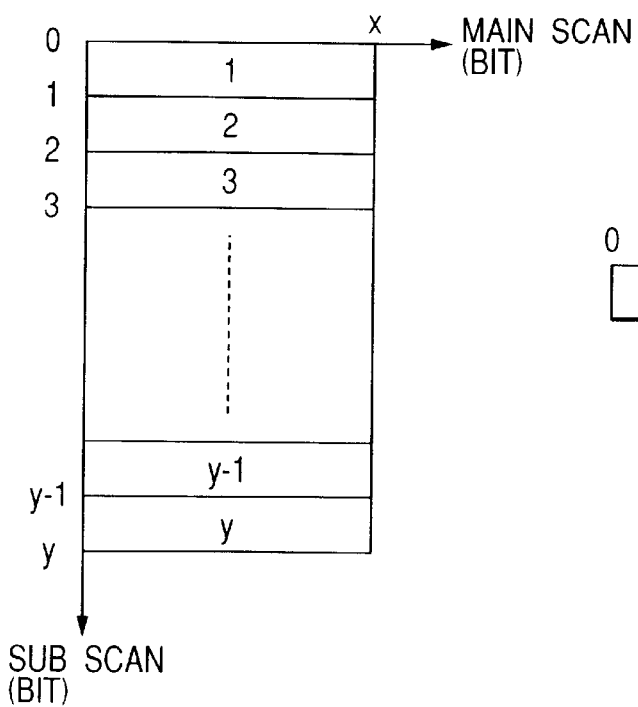
FIGS. 13A and 13B are diagrams for explaining an input image memory area and an input image memory, respectively.
Figure 13B:
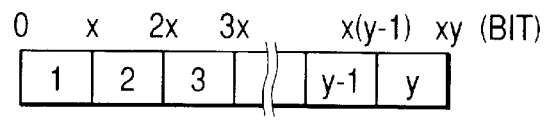

In a step S409, it is judged whether mode setting is performed by the user with the use of a "MASKING" button, a "TRIMMING" button, a "SHIFT" button or the like on the screen of FIG. 8. If it is judged that the mode setting is not performed, the read image data is written in the input image memory area (step S410), and then an output image memory area is created (step S419). Here, if it is assumed that size of the postcard being the original is x dots in the main scan direction and y dots in the subscan direction, the size of the input image memory area is xy (bits) (FIGS. 13A and 13B), and the size of the four-connective postcard dedicated sheet (including the recording sheet of which the size corresponds to the size of the four-connective postcard dedicated sheet) is 2x dots in the main scan direction and 2y dots in the subscan direction, whereby the size of the output image memory area is 4xy (bits) (FIGS. 14A and 14B).

Figure 15A:
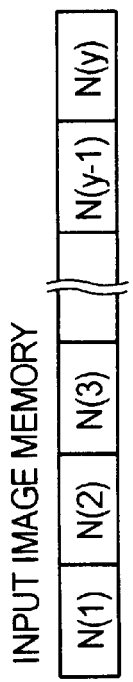
FIGS. 15A and 15B are diagrams for explaining conversion from the input image memory into the output image memory, wherein FIG. 15A explains the input image memory and FIG. 15B explains the output image memory.
Figure 15B:
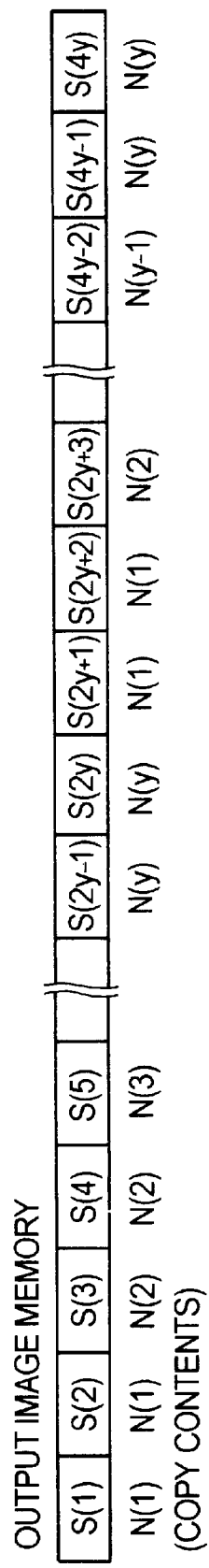
Figure 16A:
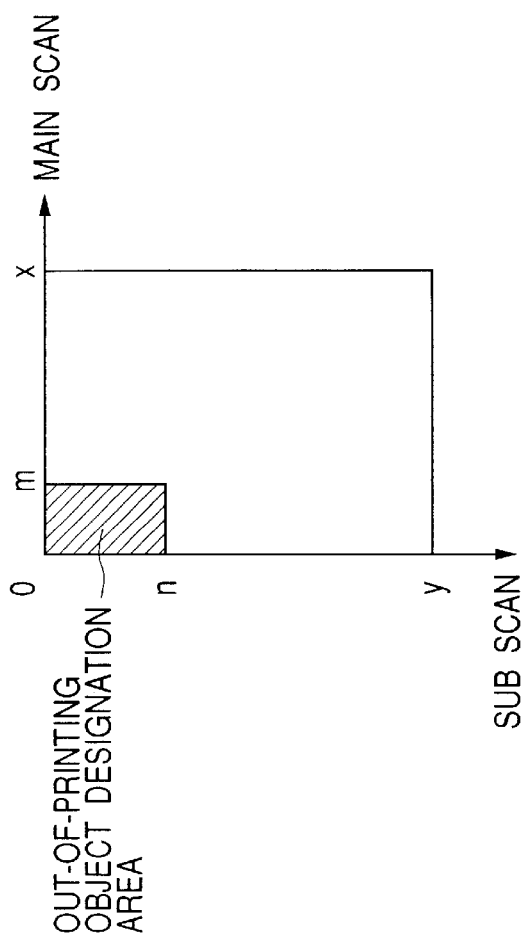
FIGS. 16A and 16B are diagrams for explaining an out-of-printing object designation area and the input image memory in case of masking setting, respectively.
Figure 16B:
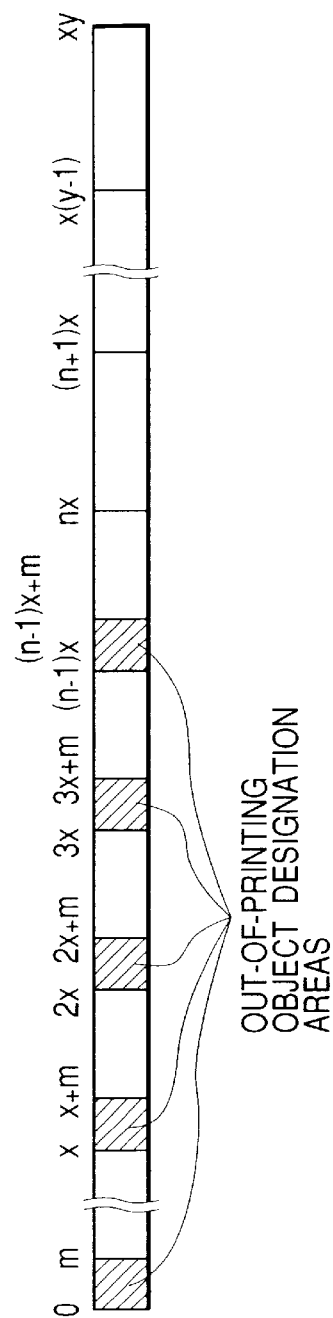

Next, with respect to the contents of the input and output image memory areas, copying and conversion of the image data are performed by x (bits) as the main scan unit area. Namely, the image data at one point in the input image memory main scan unit area is converted and copied to four points in the output image memory main scan unit area (step S420). The details of this operation is shown in FIGS. 15A and 15B. In the drawings, it is assumed that the input image memory main scan unit areas are given by N(1), N(2), N(3), . . . , N(y−1) and N(y) per x bits from the forefront, and similarly the output image memory main scan unit areas are given by S(1), S(2), S(3), . . . , S(4y−1) and S(4y) per x bits from the forefront. The content of the input image memory main scan unit area N(1) is copied to the output image memory main scan unit areas S(1), S(2), S(2y+1) and S(2y+2). Next, the content of the input image memory main scan unit area N(2) is copied to the output image memory main scan unit areas S(3), S(4), S(2y+3) and S(2y+4). This copying operation is repeated in similar manner until the content of the input image memory main scan unit area N(y) is copied to the output image memory main scan unit areas S(2y−1), S(2y), S(4y−1) and S(4y).

After the copying operation to the output image memory ended (i.e., the four identical image were formed on the memory), the output image memory contents are transferred as the output image data from the control apparatus 110 to the printer unit 300, and then these contents are printed on the four-connective postcard dedicated sheet by the printer unit 300 (step S421).

After the printing ended, the four-connective postcard dedicated sheet is transported to the sheet discharge unit 330. In the case where there are the plural four-connective postcard dedicated sheets (including the recording sheets of which the size corresponds to the size of the four-connective postcard dedicated sheet), these four-connective postcard dedicated sheets discharged from the body of the printer unit are sheaved and sorted by the sorting unit 300 acting as a sheet processing apparatus. For example, a sheet sorting process such as simple sorting or group sorting is performed by first performing a sheet adjusting process, using a not-shown sorter or the like having plural bins, and performing a sheet sheaf discharge operation such that each (one copy) of sheet groups respectively made by plural pages is stacked on a stacking tray in the state that each copy is shifted to others. In this case, each unit is controlled such that the stapling by a not-shown stapler and the punching by a not-shown puncher are inhibited.

In the sheet sorting process, the number of output sheets is counted by a not-shown counter to generate sheet output number information. Thus, the apparatus may automatically perform the sheet sorting process based on its original judgement, in accordance with the sheet output number information, setting number information input from the operation unit 150, and the like. For example, after the user performs the setting for the sheet sorting on the screen shown in FIGS. 7A and 7B, the apparatus may perform the user's desired sheet sorting process according to the above setting.

Thus, according to the kind of sheet on which the image forming should be performed is the four-connective postcard dedicated sheet (including the recording sheet of which the size corresponds to the size of the four-connective postcard dedicated sheet), i.e., according to the operation mode set on the operation unit 150 by the user is the four-connective postcard printing mode, the working processes for the sheets such as the stapling process by the stapling unit, the punching process by the punching unit and the like are inhibited. For example, the corresponding function button on the operation unit is displayed in shading to be in an unavailable state such that this button does not respond even if the user depresses it. On the other hand, in consideration of sheet adjustment, sheet stack and the like in the case where the plural four-connective postcard dedicated sheets (including the recording sheets of which the size corresponds to the size of the four-connective postcard dedicated sheet) are output, it is permitted to perform the sheet sorting process or the like in the four-connective postcard printing mode. For example, even if the four-connective postcard printing mode is selected on the operation unit by the user, the function button corresponding to this selected mode is made available, and the sorting mode is automatically executed based on the set number of sheets, the set number of copies, and the like.

In the steps S409 to S414, input of the image data in a specific rectangular area (i.e., a designated area) such as an area on a postcard where a postage stamp has been printed, an area on a New Years's card where a lottery has been printed, or the like is inhibited, and on the contrary only the image in the designated area is input.

As a result of the judgement in the step S409, if the "MASKING" button is selected, i.e., if the specific rectangular area (designated area) to which any image is not input is set (YES in a step S411), the data bit of the area other than the above specific rectangular area is set to be "0" and written in the input image memory area (step S412). After then, when the "TRIMMING" button is selected to set a trimming function, i.e., when it is set to input only the image in the designated area (YES in a step S413), the data bit of the specific rectangular area is set to be "0" representing no data and written in the input image memory area (step S414). After then, the flow advances to the step S419, and thus the processes in the steps S419 to S421 are performed.

In the above operation, by way of example, the case where the "MASKING" button is selected (YES in a step S411) will be explained in detail.

Figure 9:
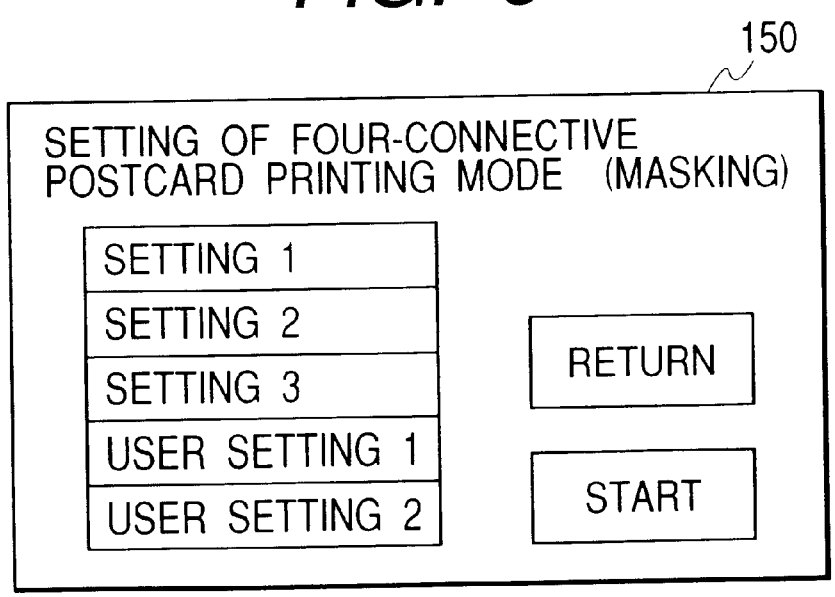
FIG. 9 is a diagram showing an example of a display on the operation unit 150 in FIG. 1.
Figure 10:
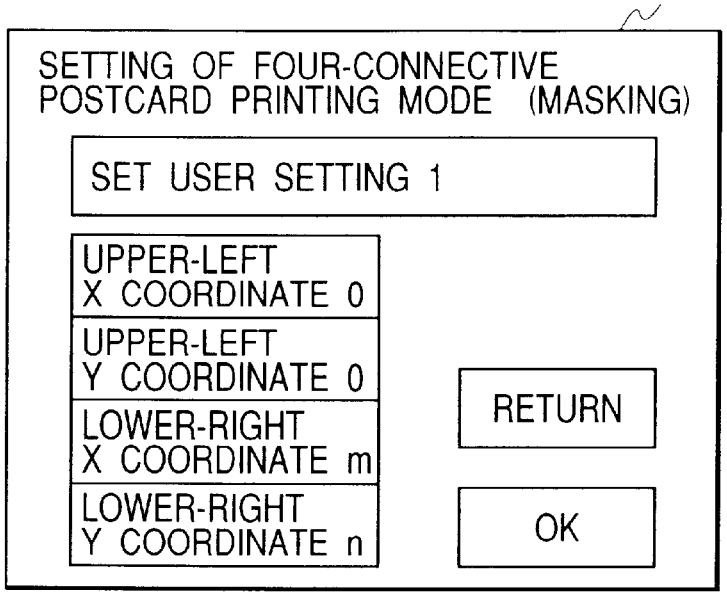
FIG. 10 is a diagram showing an example of a display on the operation unit 150 in FIG. 1.
Figure 17A:
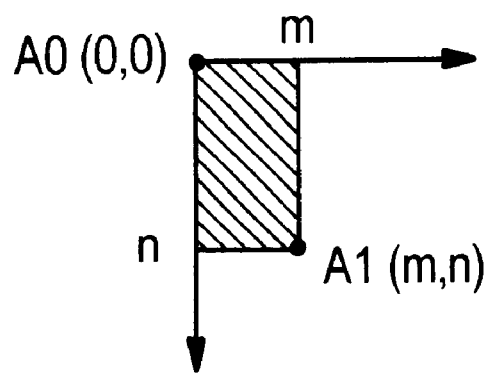
FIGS. 17A and 17B are diagrams for explaining a shift origin original image area and the input image memory in case of shift setting, respectively.

In this case, the data of the designated area may be previously registered in a device or freely set by the user. When the data of the designated area is set by the user, an item "USER SETTING 1" is selected on a screen of FIG. 9, an area designation screen is displayed (FIG. 10), whereby plural rectangular areas each enclosed between the two arbitrary points can be set. Next, as an example of masking, a user's setting to perform the masking for a postage stamp area will be explained. As shown in FIG. 17A, in order to designate the rectangular area enclosed between points A0(0, 0) and A1(m, n) as the postage stamp area, both the upper left x and y coordinates are set to be "0", and the lower right x and y coordinates are set to be "m" and "n" respectively as shown in FIG. 10. Then, when an OK key is depressed, the above-mentioned area is registered as the masking designation area. It should be noted that the screens shown in FIGS. 9 and 10 are directed to one example of the change of the displayed contents, but the displayed contents are not limited to them.

In the above-given description, the output cannot be obtained in the designated masking area when the printing is performed. Further, in the trimming area, the image data bit corresponding to this area depends on the input image memory, and the image data corresponding to the area other than this area is set to be "0".

Further, in steps S415 to S418, the original image data is read and set to a designated position on a postcard.

Figure 11:
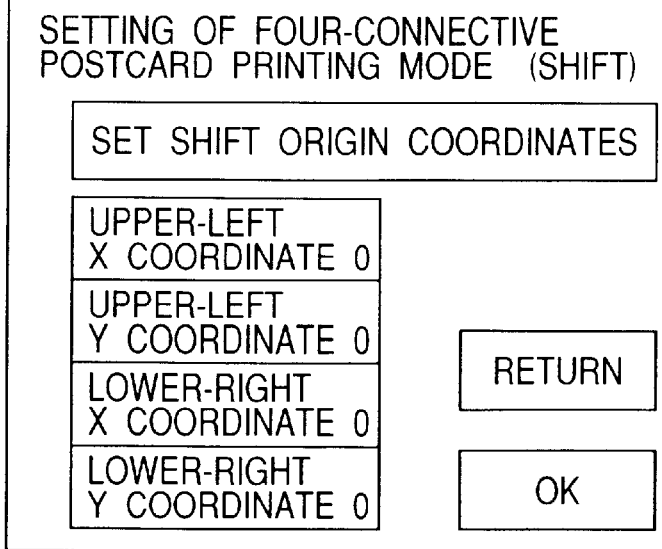
FIG. 11 is a diagram showing an example of a display on the operation unit 150 in FIG. 1.
Figure 12:
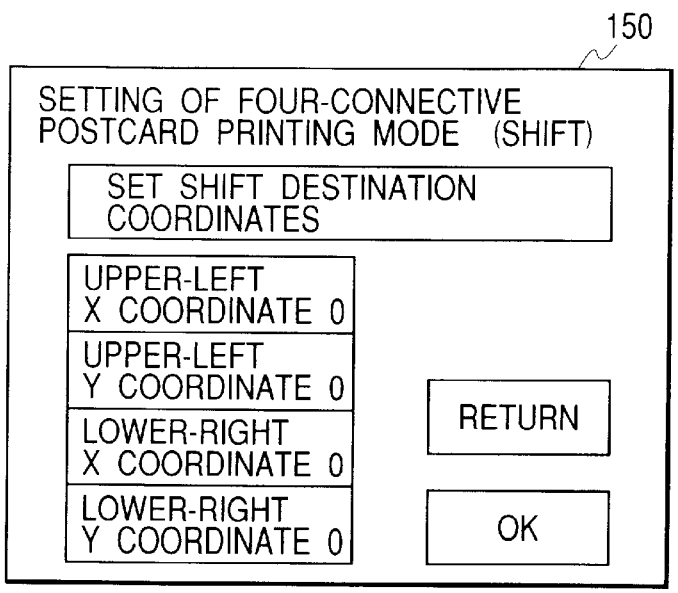
FIG. 12 is a diagram showing an example of a display on the operation unit 150 in FIG. 1.

As a result of the judgement in the step S409, if the "SHIFT" button is selected (YES in the step S415), a rectangular area enclosed between points A0(0, 0) and A1(m, n) is selected on a screen of FIG. 11 as a shift origin original image area. Then, on a screen shown in FIG. 12, the upper left point such as A2(x2, y2) of the original image is designated as a shift destination original position. Namely, to which position on one sheet of postcard it is intended to set the original image is designated (step S416). At this time, when the set original image is outside the area of the one-sheet postcard size, the data of the outside image part is ignored. It should be noted that the screens shown in FIGS. 11 and 12 are directed to one example of the change of the displayed contents, but the displayed contents are not limited to them.

Figure 17B:
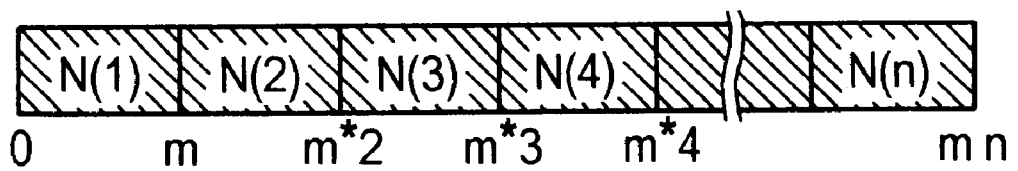

As shown in FIGS. 17A and 17B, if it is assumed that the shift origin original size is m dots in the main scan direction and n dots in the subscan direction, the size of the input image memory area is given by the mn bits. Here, the input image memory main scan unit areas are given by N(1), N(2), N(3), . . . , N(n−1) and N(n) per m bits from the forefront.

Figure 18A:
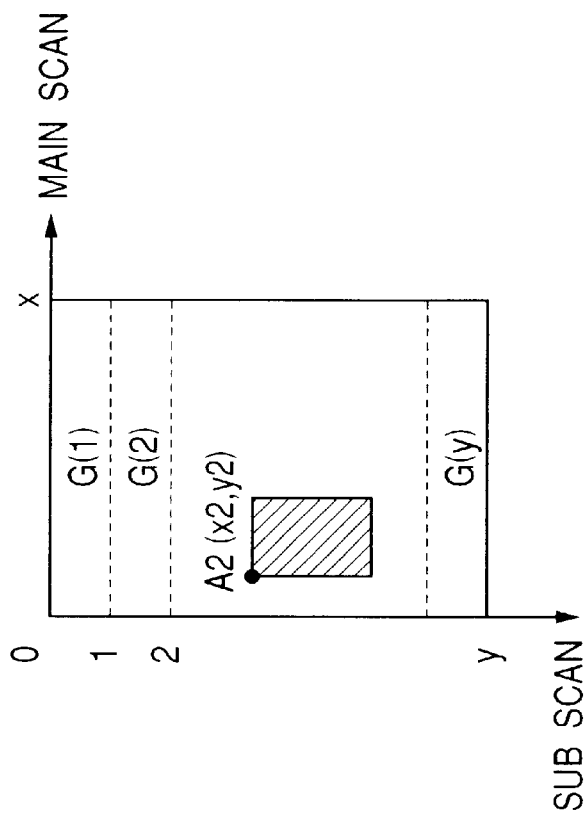
FIGS. 18A and 18B are diagrams for explaining a shift destination original image area and the input image memory in case of the shift setting, respectively.
Figure 18B:
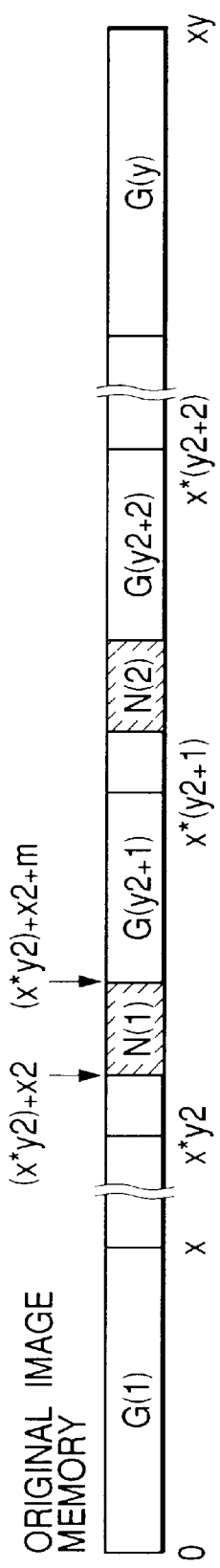

When the reading of the original image ends, the original image memory area corresponding to the postcard size of x dots in the main scan direction and y dots in the subscan direction is created in the control device (step S417), and the original image memory main scan unit areas are given by G(1), G(2), G(3), . . . , G(n−1) and G(n) per x bits from the forefront. To do so, the input image of m-bit size from the position obtained by shifting the area N(1) from the head of the area G(y2+1) by x2 bits is copied to the original image (step S418). At this time, when the value of (x2+m) is larger than the original image main scan unit (x bits), the part larger than x is not copied. Similarly, the input image of m-bit size from the position obtained by shifting the next area N(2) from the head of the area G(y2+2) by x2 bits is copied to the original image, and such operation is repeated until the input image of m-bit size from the position obtained by shifting the area N(n) from the head of the area G(y2+n) by x2 bits is copied to the original image (FIGS. 18A and 18B).

As described above, after the copying process to the original image memory area ended, the flow advances to the step S419, whereby the processes in the steps S419 to S421 are performed.

In the embodiment, in order to improve productivity, the sheet for the four-connective postcard is used to obtain the output result corresponding to four postcards at one time. However, the embodiment is applicable to a case where image forming is performed such that plural images are arranged on the identical face of a sheet of which the size is larger than that of the four-connective postcard dedicated sheet (i.e., a sheet corresponding to at least two or more postal cards such as an eight-connective postcard dedicated sheet, a 16-connective postcard dedicated sheet, or the like).

A program to achieve the process (function) of the embodiment has been stored as program codes in the ROM 114, and the CPU 112 reads these codes to execute the function. It is needless to say that the object of the present invention can be achieved in a case where a storage medium storing the program codes of software to achieve the function of the embodiment is supplied to a system or apparatus, and then a computer (or CPU or MPU) in this system or apparatus reads and executes the stored program codes.

In this case, the program codes themselves read from the storage medium execute the function of the embodiment, whereby the storage medium storing these program codes constitutes the present invention.

As the storage medium from which the program codes are supplied, e.g., a floppy disk, a hard disk, an optical disk, a magnetooptical disk, a CD-ROM, a CD-R, a magnetic tape, a nonvolatile memory card, a ROM or the like can be used.

Further, it is needless to say that the present invention includes not only the case where the function of the embodiment is executed by the program codes read by the computer, but also a case where an OS (operating system) or the like running on the computer executes a part or all of the actual processes based on instructions of the program codes and thus the functions of the above embodiments are executed by such processes.

Further, it is needless to say that the present invention includes a case where the program codes read from the storage medium are once stored in a memory provided in a function expansion board inserted in the computer or a function expansion unit connected to the computer, and then a CPU or the like provided in the function expansion board or the function expansion unit performs a part or all of the actual processes based on instructions of the program codes, whereby the function of the embodiment is achieved by such processes.

As explained above in detail, according to the embodiment, in the case where the recording sheet is a the size by which the plural images can be arranged on its identical face, when printing of the original is performed to produce a large number of copies, it is possible to shorten the necessary time by using the above-noted recording sheet.

Further, it is possible to prevent that the sheets used as output sheets are inconsiderately punched and/or stapled.

Further, if the four-connective printing mode is selected from among the plural operation modes selectable by the user, it is possible to inhibit the working process for the sheets on which the images are formed. Incidentally, by performing the control according to the operation mode selected through the operation unit, it is unnecessary to perform the judgement for the type (material type) of sheet on which the image should be formed actually, whereby productivity and cost performance can be improved.

Further, if the four-connective printing mode is selected from among the plural operation modes selectable by the user, without requiring user's setting or the like on the operation unit, it is possible to inhibit the stapling process for the sheets on which the images were formed and conversely permit the sorting process for the sheets, whereby operability can be improved.

As many apparently and widely different embodiments of the present invention can be made without departing from the spirit and scope of the present invention, it is to be understood that the present invention is not limited to the specific embodiments thereof expect as defined in the appended claims.

What is claimed is:

1. An image forming system, which forms images on a sheet , comprising:
    selection means for selecting any one of a plurality of image forming modes including a first mode, wherein an image forming process is performed such that the images are arranged on an identical face of the sheet;
    image forming means for performing the image forming process on the basis of an image forming mode selected by said selection means; and
    control means for inhibiting a working process for the sheet on which the images have been formed by said image forming means, in accordance with the first mode being selected by said selection means.

2. A system according to claim 1, wherein the working process includes one or more of a punching process and a stapling process.

3. A system according to claim 1, wherein the first mode is a postcard printing mode in which identical images are arranged on the identical face of the sheet.

4. A system according to claim 1, wherein said control means inhibits the working process and permits a sorting process for the sheet on which the images have been formed by said image forming means, in accordance with the first mode being selected by said selection means.

5. A system according to claim 1, wherein said control means inhibits the working process for the sheet on which the images have been formed by said image forming means, in accordance with the first mode being selected irrespective of a judgement as to a type of the sheet on which the images are to be formed.

6. A system according to claim 1, wherein said control means determines whether the working process should be performed for the sheet on which the images have been formed by said image forming means, on the basis of a judgement as to whether the first mode is selected and a judgement as to whether a size of the sheet on which the images are to be formed is adequate, irrespective of a judgement as to a type of the sheet on which the images are to be formed.

7. A system according to claim 1, wherein said image forming means forms on the sheet, the images based on image data input through reading means for reading an image of an original.

8. A system according to claim 7, wherein in the first mode, image forming is not performed for the image data, among the input image data, corresponding to a specific rectangular area part of the original.

9. A system according to claim 7, wherein in the first mode, the image forming is performed only for the image data, among the input image data, corresponding to a specific rectangular area part of the original.

10. A system according to claim 7, wherein in the first mode, the input image data is converted to be at arbitrary positions on the identical face of the sheet.

11. A system according to claim 1, wherein in the first mode, a sheet being usable includes a four-connective postcard dedicated sheet on which four postcard parts are connectively arranged at upper right, upper left, lower right, and lower left parts.

12. A system according to claim 11, wherein in the first mode, a sheet being usable includes a sheet of which a size is the same as that of the four-connective postcard dedicated sheet.

13. An image forming system, which forms images on a sheet , comprising:
   selection means for selecting any one of a plurality of image forming modes including a first mode, wherein an image forming process is performed such that the images are arranged on an identical face of the sheet;
   image forming means for performing an image forming process on the basis of the image forming mode selected by said selection means; and
   control means for inhibiting a stapling process and permitting a sorting process for the sheet on which the images have been formed by said image forming means, in accordance with the first mode being selected by said selection means.

14. An image forming system, which forms images on a sheet , comprising:
   selection means for selecting any one of a plurality of image forming modes including a first mode, wherein an image forming process is performed such that the images are arranged on an identical face of the sheet;
   image forming means for performing the image forming process on the basis of an image forming mode selected by said selection means; and
   control means for inhibiting a punching process and permitting a sorting process for the sheet on which the images have been formed by said image forming means, in accordance with the first mode being selected by said selection means.

15. A control method for an image forming system, which includes an image forming means for forming images on a sheet, said method comprising:
   a selection step of selecting any one of a plurality of image forming modes including a first mode, wherein an image forming process is performed such that the images are arranged on an identical face of the sheet; and
   a control step of inhibiting a working process for the sheet on which the images have been formed by the image forming means, in accordance with the first mode being selected in said selection step.

16. A method according to claim 15, wherein the working process includes one or more of a punching process and a stapling process.

17. A method according to claim 15, wherein the first mode is a postcard printing mode in which the identical images are arranged on the identical face of the sheet.

18. A method according to claim 15, wherein said control step inhibits the working process and permits a sorting process for the sheet on which the images have been formed by the image forming means, in accordance with the first mode being selected by said selection step.

19. A method according to claim 15, wherein said control step inhibits the working process for the sheet on which the images have been formed by the image forming means, in accordance with the first mode being selected, irrespective of judgement as to what type of the sheet on which the images are to be formed.

20. A method according to claim 15, wherein said control step determines whether the working process should be performed for the sheet on which the images have been formed by the image forming means, on the basis of a judgement as to whether the first mode is selected and a judgement as to whether a size of the sheet on which the images are to be formed is adequate, irrespective of a judgement as to a type of the sheet on which the images are to be formed.

21. A method according to claim 15, wherein the image forming means forms on the sheet, the images based on image data input through a reading means for reading an image of an original.

22. A method according to claim 21, wherein in the first mode, the image forming is not performed for the image data, among the input image data, corresponding to a specific rectangular area part of the original.

23. A method according to claim 21, wherein in the first mode, the image forming is performed only for the image data, among the input image data, corresponding to a specific rectangular area part of the original.

24. A method according to claim 21, wherein in the first mode, the input image data is converted to be at arbitrary positions on the identical face of the sheet.

25. A method according to claim 15, wherein in the first mode, a sheet being usable includes a four-connective postcard dedicated sheet on which four postcard parts are connectively arranged at upper right, upper left, lower right, and lower left parts.

26. A method according to claim 25, wherein in the first mode, a sheet being usable includes a sheet of which a size is the same as that of the four-connective postcard dedicated sheet.

27. A control method for an image forming system, which includes an image forming means for forming images on a sheet, comprising:
   a selection step of selecting any one of a plurality of image forming modes including a first mode, wherein an image forming process is performed such that the images are arranged on an identical face of the sheet; and
   a control step of inhibiting a stapling process and permitting a sorting process for the sheet on which the images have been formed by the image forming means, in accordance with the first mode being selected in said selection step.

28. A control method for an image forming system, which includes an image forming means for forming images on a sheet, said method comprising:
   a selection step of selecting any one of a plurality of image forming modes including a first mode, wherein an image forming process is performed such that the images are arranged on an identical face of the sheet; and
   a control step of inhibiting a punching process and permitting a sorting process for the sheet on which the images have been formed by the image forming means, in accordance with the first mode being selected in said selection step.

29. A computer-readable storage medium, which stores a program to cause an image forming system which includes an image forming means for forming images on a sheet, to perform:
   a selection step of selecting any one of a plurality of image forming modes including a first mode, wherein an image forming process is performed such that the images are arranged on an identical face of the sheet; and
   a control step of inhibiting a working process for the sheet on which the images have been formed by the image forming means, in accordance with the first mode being selected in said selection step.

30. A computer-readable storage medium, which stores a program to cause an image forming system which includes an image forming means for forming images on a sheet, to perform:
   a selection step of selecting any one of a plurality of image forming modes including a first mode, wherein an image forming process is performed such that the images are arranged on an identical face of the sheet; and
   a control step of inhibiting a stapling process and permitting a sorting process for the sheet on which the images have been formed by the image forming means, in accordance with the first mode being selected in said selection step.

31. A computer-readable storage medium, which stores a program to cause an image forming system which includes an image forming means for forming images on a sheet, to perform:
   a selection step of selecting any one of a plurality of image forming modes including a first mode, wherein an image forming process is performed such that the images are arranged on an identical face of the sheet; and
   a control step of inhibiting a punching process and permitting a sorting process for the sheet on which the images have been formed by the image forming means, in accordance with the first mode being selected in said selection step.

32. An image forming system comprising:
   image data input unit for inputting image data of an original;
   an image data output unit for outputting image data based on the input image data for a recording sheet; and
   an image data conversion unit for converting, when the recording sheet is a size on which the images can be arranged on an identical face of the recording sheet, the input image data into the image data for the recording sheet by which the images can be arranged on the identical face of the recording sheet,
   a punching unit for punching the recording sheet;
   a stapling unit for stapling the recording sheet; and
   a control unit for controlling operations of said punching unit and said stapling unit,
   wherein, if the recording sheet is a size on which the images can be arranged on an identical face of the recording sheet, said control unit does not activate said punching unit and said stapling unit.

33. A system according to claim 32, wherein said image data conversion unit does not convert the image data, among the input image data, corresponding to a specific rectangular area portion of the original.

34. A system according to claim 32, wherein said image data conversion unit converts the image data, among the input image data, corresponding to a specific rectangular area portion of the original.

35. An image forming system comprising:
   an image data input unit for inputting image data of an original;
   an image data output unit for outputting image data based on the input image data for a recording sheet; and
   an image data conversion unit for converting, when the recording sheet is a size on which images can be arranged on an identical face of the recording sheet, the input image data into the image data for the recording sheet by which the images can be arranged on the identical face of the recording sheet,
   wherein the recording sheet is a four-connective postcard dedicated sheet on which four postcard parts are connectively arranged at upper right, upper left, lower right, and lower left parts.

36. An image forming system comprising:
   an image data input unit for inputting image data of an original;
   an image data output unit for outputting image data based on the input image data for a recording sheet; and
   an image data conversion unit for converting, when the recording sheet is a size on which images can be arranged on an identical face of the recording sheet, the input image data into the image data for the recording sheet by which the images can be arranged on the identical face of the recording sheet,
   wherein said image data conversion unit converts the input image data to be at arbitrary positions on the identical face of the recording sheet.

37. A system according to claim 36, wherein said image data conversion unit does not convert the input image data outside of an original area.

38. A control method for an image forming system, which includes image data input means for inputting image data of an original and image data output means for outputting image data based on the input image data for a recording sheet, said method comprising:

- an image data conversion step of converting, when a recording sheet is a size on which images can be arranged on an identical face of the recording sheet, the input image data into the image data for the recording sheet by which the images can be arranged on the identical face of the recording sheet; and
- a controlling step of controlling an operation of working process means for performing a working process for the recording sheet,
- wherein, if the recording sheet is a size on which the images can be arranged on the identical face of the recording sheet, said controlling step does not activate said working process means.

39. A control method for an image forming system, which includes image data input means for inputting image data of an original and image data output means for outputting image data based on the input image data for a recording sheet, said method comprising:

- an image data conversion step of converting, when a recording sheet is a size on which images can be arranged on an identical face of the recording sheet, the input image data into the image data for the recording sheet by which the images can be arranged on the identical face of the recording sheet,
- wherein the recording sheet is four-connective postcard dedicated sheet on which four postcard parts are connectively arranged at upper right, upper left, lower right, and lower left parts.

40. A control method for an image forming system, which includes image data input means for inputting image data of an original and image data output means for outputting image data based on the input image data for a recording sheet, said method comprising:

- an image data conversion step of converting, when a recording sheet is a size on which images can be arranged on an identical face of the recording sheet, the input image data into the image data for the recording sheet by which the images can be arranged on the identical face of the recording sheet,
- wherein said image data conversion step converts the input data to be at arbitrary positions on the identical face of the recording sheet.

* * * * *

UNITED STATES PATENT AND TRADEMARK OFFICE
CERTIFICATE OF CORRECTION

PATENT NO. : 6,459,864 B2
DATED : October 1, 2002
INVENTOR(S) : Kazuhiro Kasai et al.

It is certified that error appears in the above-identified patent and that said Letters Patent is hereby corrected as shown below:

<u>Title page,</u>
Item [57], ABSTRACT,
Line 9, "formed" should read -- formed. --.

<u>Column 7,</u>
Line 49, "become no use as a whole thereby waste of resources." should read
-- are of no use as a whole thereby wasted resources. --.

<u>Column 12,</u>
Line 57, "sheet ," should read -- sheet, --.

<u>Column 13,</u>
Lines 52 and 67, "sheet ," should read -- sheet, --.

Signed and Sealed this

Twenty-fifth Day of February, 2003

JAMES E. ROGAN
*Director of the United States Patent and Trademark Office*